(12) United States Patent
Furuyama (10) Patent No.: US 7,556,441 B2
(45) Date of Patent: Jul. 7, 2009

(54) OPTICAL CONNECTOR AND PROCESS FOR CONNECTING OPTICAL FIBERS

(75) Inventor: Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/943,993

(22) Filed: Nov. 21, 2007

(65) Prior Publication Data
US 2008/0118205 A1    May 22, 2008

(30) Foreign Application Priority Data
Nov. 21, 2006    (JP) .............................. 2006-314042

(51) Int. Cl.
G02B 6/255  (2006.01)
G02B 6/245  (2006.01)
G02B 6/00   (2006.01)

(52) U.S. Cl. ......................................... 385/95; 385/137
(58) Field of Classification Search ........................ None
See application file for complete search history.

(56) References Cited

U.S. PATENT DOCUMENTS

| | | | |
|---|---|---|---|
| 5,993,070 A | 11/1999 | Tamekuni et al. | |
| 6,193,421 B1 | 2/2001 | Tamekuni et al. | |
| 6,779,931 B2 * | 8/2004 | Murata et al. | 385/98 |
| 2005/0213893 A1 | 9/2005 | Hamasaki et al. | |
| 2006/0039658 A1 | 2/2006 | Furuyama et al. | |

FOREIGN PATENT DOCUMENTS

| | | |
|---|---|---|
| JP | 10-170756 | 6/1998 |
| JP | 2005-321755 | 11/2005 |

* cited by examiner

*Primary Examiner*—Omar Rojas
(74) *Attorney, Agent, or Firm*—Oblon, Spivak, McClelland, Maier & Neustadt, P.C.

(57) ABSTRACT

An optical connector configured to connect a pair of coated optical fibers, each of which includes an exposed leading end of optical fiber, and a process to connect a pair of coated optical fibers using the connector. The connector includes: a connector body including a fine hole portion for housing and mutually butting the exposed leading ends of the pair of coated optical fibers, a first receiving portion and a second receiving portion, which are disposed at both outer sides in the axial direction of the fine hole portion, for housing the individual coated optical fibers without pressing the coating, and a holding portion, which is disposed at an outer side in the axial direction of the fine hole portion and at a side of the first receiving portion against the fine hole portion, for housing one of the coated optical fibers and holding the coated optical fiber by pressing the coating.

16 Claims, 5 Drawing Sheets

OPTICAL CONNECTOR AND PROCESS FOR CONNECTING OPTICAL FIBERS

CROSS-REFERENCE TO RELATED APPLICATIONS

This application is based upon and claims the benefit of priority from the prior Japanese Patent Application No. 2006-314042 filed on Nov. 21, 2006; the entire contents of which are incorporated herein by reference.

BACKGROUND

Some optical connectors have been known for connecting a pair of resin jacket coated optical fibers, wherein optical fibers are integrated together with the connector body by fixing with an adhesive in a through hole of the connector body, the exposed ends of two optical fibers being butted to each other.

SUMMARY

According to an aspect of the present invention, there is provided an optical connector for connecting a pair of coated optical fibers, each of which comprises an exposed leading end of optical fiber, including: a connector body having a fine hole portion for housing and mutually butting the exposed leading ends of the pair of coated optical fibers, a first receiving portion and a second receiving portion, which are disposed at both outer sides in the axial direction of the fine hole portion, for housing the individual coated optical fibers without pressing the coating, and a holding portion, which is disposed at an outer side in the axial direction of the fine hole portion, for housing one of the coated optical fibers and holding the coated optical fiber by pressing the coating.

According to another aspect of the present invention, there is provided a process for connecting a pair of coated optical fibers, each of which comprises an exposed leading end of optical fiber, using an optical connector, comprising: applying an adhesive into the optical connector, wherein the optical connector comprises a connector body comprising a fine hole portion for housing and mutually butting the exposed leading ends of the pair of coated optical fibers, a first receiving portion and a second receiving portion, which are disposed at both outer sides in the axial direction of the fine hole portion, for housing the individual coated optical fibers without pressing the coating, and a holding portion, which is disposed at an outer side in the axial direction of the fine hole portion, for housing one of the coated optical fibers and holding the coated optical fiber by pressing the coating, and wherein the adhesive is applied into the fine hole portion; inserting one of the coated optical fibers to house the exposed leading end of optical fiber in the fine hole portion and to hold the coated optical fiber in the holding portion; inserting the other of the coated optical fibers to butt the exposed leading end of optical fiber with the exposed leading end of optical fiber of the inserted coated optical fiber within the fine hole portion; and fixing the individual optical fibers to the optical connector with the adhesive.

DETAILED DESCRIPTION

Embodiments according to the present invention will be described below with reference to the drawings. It is to be noted that the drawings are provided for illustration only and do not limit the present invention at all.

In a conventional optical connector, connecting workability is poor and it is hard to obtain a stably butted state of the optical fibers because it is necessary to position and hold the three members of two coated optical fibers and the optical connector at the same time when they are connected.

Specifically, the existing conventional optical connector is in a state that the optical connector body and the two coated optical fibers are freely movable. When one coated optical fiber and the optical connector are held, another coated optical fiber slides down, and when two coated optical fibers are held and butted mutually, the optical connector body cannot be positioned properly. And, when the end surface of the coating of the coated optical fiber removed to expose the optical fiber is butted to a part of the inner wall forming the through hole of the optical connector body to define the position, there is a possibility of producing a problem that a gap is produced at the butted portion of the optical fibers because of an error of a removed length of the coatings or a cut-off length of the optical fibers.

Figure 1A:
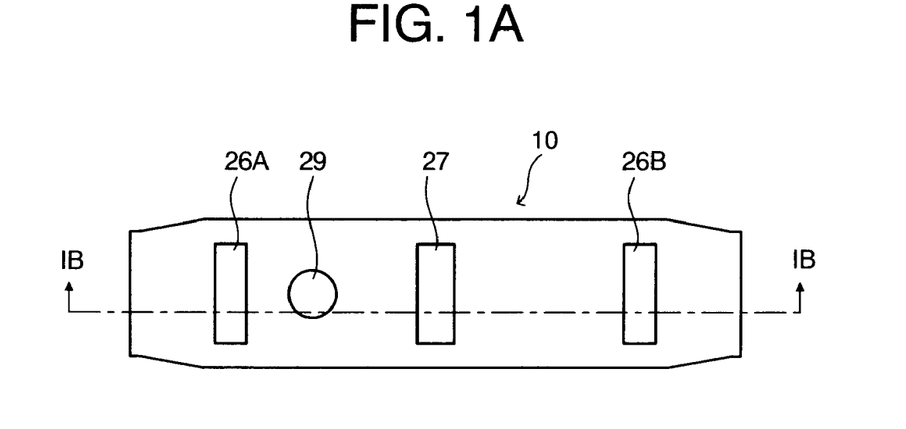
FIG. 1A is a top view showing an optical connector according to an embodiment.
Figure 1B:
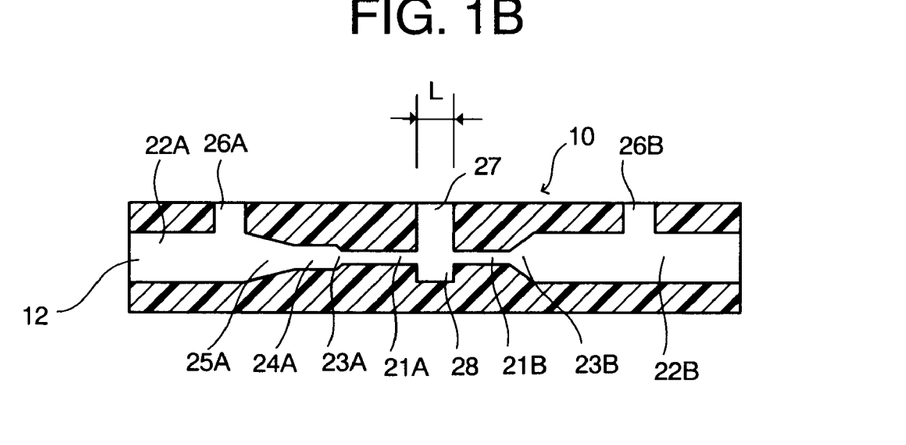
FIG. 1B is a sectional view taken along line IB-IB of FIG. 1A.
Figure 2A:
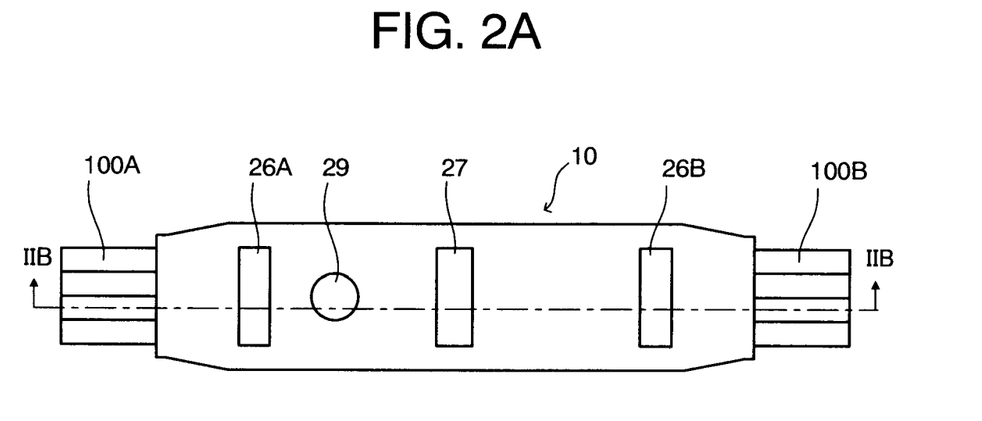
FIG. 2A is a top view showing a state that coated optical fibers are connected by using the optical connector shown in FIG. 1A.
Figure 2B:
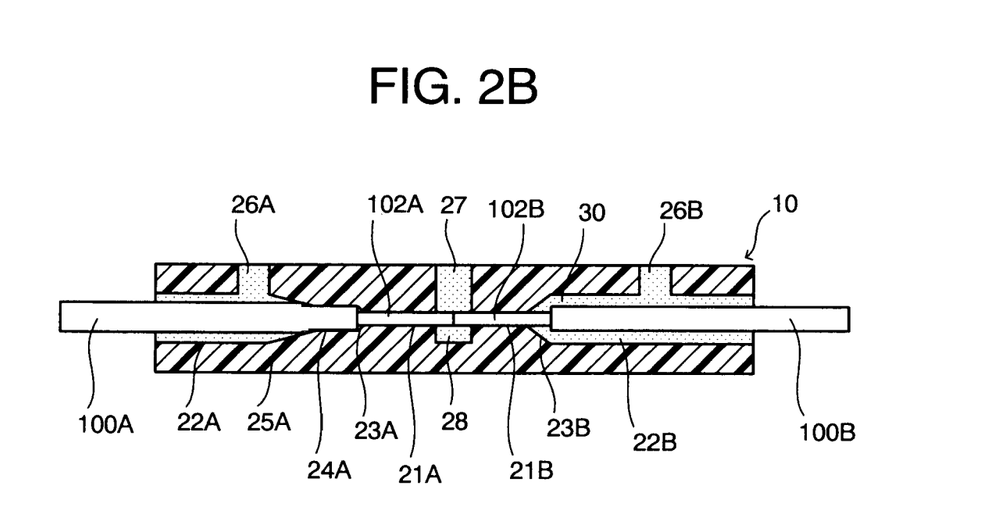
FIG. 2B is a sectional view taken along line IIB-IIB of FIG. 2A.

FIGS. 1A and 1B show an optical connector according to an embodiment of the invention. FIG. 1A is a top view, and FIG. 1B is its sectional view taken along line IB-IB. FIGS. 2A and 2B show a state that a pair of coated optical fibers is connected by using the optical connector. FIG. 2A is a top view, and FIG. 2B is a sectional view of the same portion as that of FIG. 1B, namely a sectional view taken along line IIB-IIB of FIG. 1B.

The optical connector of this embodiment is to connect single optical fibers or to connect optical fiber arrays (an optical connector for four-optical-fiber ribbon (flat arrangement array) is shown in the drawings).

By an "optical fiber" herein is meant an optical waveguide body concentrically having a core which guides light and a cladding (including a multilayer cladding) which confines light. The optical fiber includes not only a bare optical fiber which comprises the core and the cladding only, but also a multilayer cladding type optical fiber which has a non-strippable thin layer of a hard coating resin, which is disposed on the cladding and is handled in the same manner as the bare optical fiber when it is connected. The core and the cladding may be formed of any of quartz based, multicomponent glass based and plastic based materials.

A "coated optical fiber" has one or more optical fibers and a single layer or multi-layer protective coating surrounding the one or more optical fibers. The coating material used includes, but not limited to, an acrylic resin, a urethane resin, a metal and the like.

In FIGS. 1A, 1B, 2A and 2B, 10 denotes an optical connector body. The optical connector body 10 may be formed by injection molding of, for example, a thermoplastic resin such as LCP (liquid crystalline polymer), PPS (polyphenylene sulfide) or the like. The optical connector body 10 may be formed of a thermosetting resin such as an epoxy resin. The optical connector body 10 may also be an integrally-formed product or a split structure body. In addition, the above-described resins are generally used mixed with a filler such as silica. An average particle size, content or type of filler can be selected suitably depending on desired properties.

The optical connector body 10 has through holes 12 in number corresponding to the number of bare optical fibers of a pair of coated optical fibers (FIG. 2A, a first coated optical fiber 100A and a second coated optical fiber 100B) to be connected. The through holes 12 are open at the both ends of the optical connector body 10. In a case where the through holes 12 are formed in plural, namely where the first and second coated optical fibers 100A, 100B have multiple optical fibers, they are formed at a pitch corresponding to an arrangement pitch of optical fibers 102, and coupled at an entrance for accepting non-stripped region of the coated optical fiber.

The individual through holes 12 have at the center in the axial direction a first fine hole portion 21A and a second fine hole portion 21B for housing and mutually butting individual leading ends of the optical fibers (FIG. 2B, a first optical fiber 102A and a second optical fiber 102B) when the individual leading ends of the pair of coated optical fibers 100A, 100B are inserted through the individual openings. The individual through holes 12 have a first receiving portion 22A and a second receiving portion 22B which accommodate the first and second coated optical fibers 100A, 100B without pressing the coating on their both outer sides in the axial direction of the fine hole portions 21A, 21B. The first receiving portion 22A and the first fine hole portion 21A have therebetween an inside guiding portion 23A for guiding the leading end of the first optical fiber 102A into the first fine hole portion 21A, a holding portion 24A for housing the first coated optical fiber 100A and holding the first coated optical fiber 100A by pressing the coating, and an outside guiding portion 25A for guiding the first coated optical fiber 100A into the holding portion 24A arranged sequentially from the side of the first fine hole portion 21A. And, the second receiving portion 22B and the second fine hole portion 21B have therebetween a guiding portion 23B for guiding the leading end of the second optical fiber 102B from the second receiving portion 22B into the second fine hole portion 21B.

For example when the individual optical fibers 102A, 102B have a diameter of 125 μm, the first and second fine hole portions 21A, 21B may be formed as round holes having a slightly larger diameter (e.g., a diameter of 126 μm) and a length of 2 mm).

The first and second receiving portions 22A, 22B are portions for receiving the first and second coated optical fibers 10A, 100B without pressing the coating, so that they are formed as holes having a sectional shape larger than the first and second coated optical fibers 10A, 100B to be connected. Specifically, if the first and second coated optical fibers 10A, 10B are single optical fibers having a coating diameter of 300 μm, the first and second receiving portions 22A, 22B are formed as round holes having a larger diameter (e.g., a diameter of 400 μm). If they are optical fiber ribbons and have a rectangular or oval cross-sectional shape with a height of 300 μm, a width of 250 μm×optical fiber number+100 μm, they are formed as holes having a cross-sectional shape (e.g., a height of 400 μm, a width of 250 μm×optical fiber number+200 μm) larger than that. The first and second receiving portions 22A, 22B are open as coated optical fiber insertion ports at both end surfaces of the optical connector body 10.

The holding portion 24A is a portion with a protrusion that acts as a portion to hold the first coated optical fiber 100A by pressing the coating of the first coated optical fiber 100A, so that it is formed as a hole having a cross-sectional shape smaller than that of the first coated optical fiber 100A. Specifically, if the first coated optical fiber 100A is a single optical fiber with a coating diameter of 300 μm, the holding portion 24A is formed as a round hole having a smaller diameter (e.g., a diameter of 290 μm). And, if it is a optical fiber ribbon and has a rectangular or oval cross-sectional shape with a height of 300 μm, a width of 250 μm×optical fiber number+100 μm, it is formed as a hole having a smaller cross sectional shape (e.g., a height of 280 μm, a width of 250 μm×optical fiber number+200 μm).

Figure 1C:
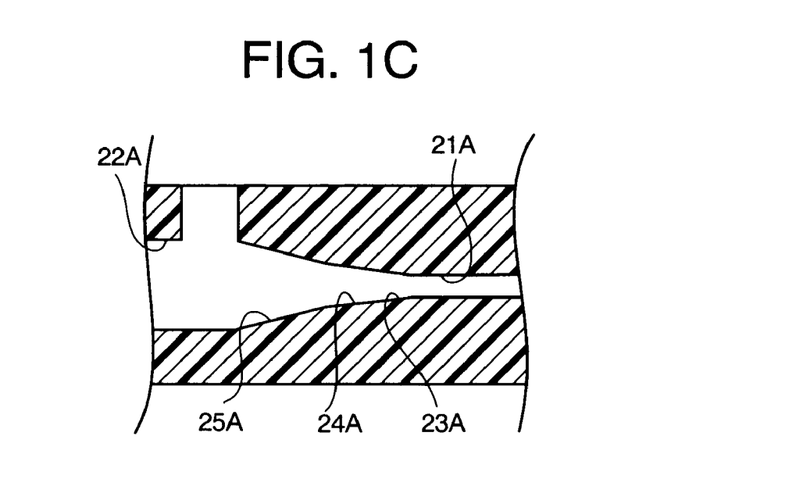
FIG. 1C is a sectional view showing a modified example of a holding portion of FIG. 1B.

The holding portion 24A is appropriate if it can hold the first coated optical fiber 100A and its cross-sectional shape and size are not necessarily required to be constant in the axial direction as described above. Therefore, for example, it may be formed to have a tapered shape having a diameter which is decreased gradually from the first receiving portion 22A toward the fine hole portion 21 as shown in FIG. 1C. Specifically, for example, a single optical fiber having a coating diameter of 300 μm may be formed to have a tapered shape with a diameter decreased from 320 μm to 260 μm from the first receiving portion 22A toward the fine hole portion 21. In this case, there is provided effects that variations in coating thickness of the coated optical fiber can be absorbed, and size specifications for the coating of the coated optical fiber can be provided with allowance.

In FIG. 1B, the guiding portion 23B, the inside guiding portion 23A and the outside guiding portion 25A are formed as tapered holes but may have a linear portion. Specifically, for example, if the optical fibers 102A, 102B have a diameter of 125 μm, the guiding portion 23B and the inside guiding portion 23A may have a linear portion having a slightly larger diameter (e.g., a diameter of 200 μm) on the sides of the second receiving portion 22B and the first receiving portion 22A.

The optical connector body 10 is also provided with first and second adhesive injection ports 26A, 26B for injection of an adhesive from exterior into the first and second receiving portions 22A, 22B and also a bubble release port 27 for externally releasing air bubbles contained in the injected adhesive. The first and second adhesive injection ports 26A, 26B are formed above the first and second receiving portions 22A, 22B as holes having their axial directions determined to be substantially orthogonal to the axial direction of the through hole 12. The bubble release port 27 is formed between the first fine hole portion 21A and the second fine hole portion 21B as a hole having its axial direction determined to be substantially orthogonal to the axial direction of the through hole 12. The bubble release port 27 is also formed to function as a port which can be used to check the butted portion of the leading ends of the first and second optical fibers 102A, 102B inserted into the first and second fine hole portions 21A, 21B. In other words, the bubble release port 27 is formed such that the butted portion of the leading ends of the first and second optical fibers 102A, 102B is observed in the bubble release port 27.

In addition, a space 28 is formed at the bottom of the bubble release port 27 to keep the butted portion of the leading ends of the first and second optical fibers 102A, 102B in non-contact with the inner walls of the first and second fine hole portions 21A, 21B. And, an identification mark 29 indicating the side that the holding portion 24A is formed is put on the top surface of the optical connector body 10.

A process for mutually connecting the corresponding optical fibers 102A, 102B of the first and second coated optical fibers 10A, 100B by using the optical connector configured as described above is described below. FIGS. 3A through 3D are sectional views showing steps of the optical fiber connecting process using the above-described optical connector.

Figure 3A:
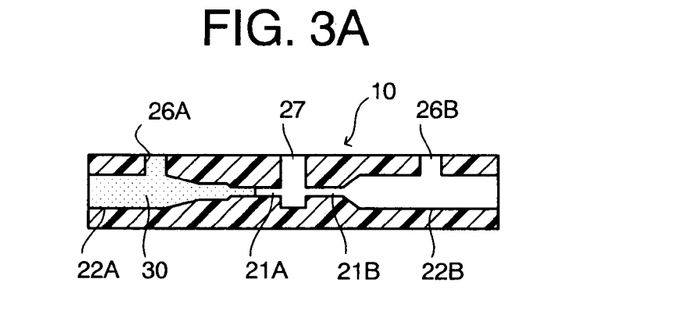
FIGS. 3A to 3D are sectional views showing an optical fiber connecting process using the optical connector shown in FIG. 1A.

First, as shown in FIG. 3A, an adhesive 30 is injected through the adhesive injection port (the first adhesive injection port 26A) on the side that the identification mark 29 is put. The adhesive 30 can be any type of adhesives such as a thermosetting type, a UV curing type and the like if the butted portion of the optical fibers can be secured to be transparent.

Figure 3B:
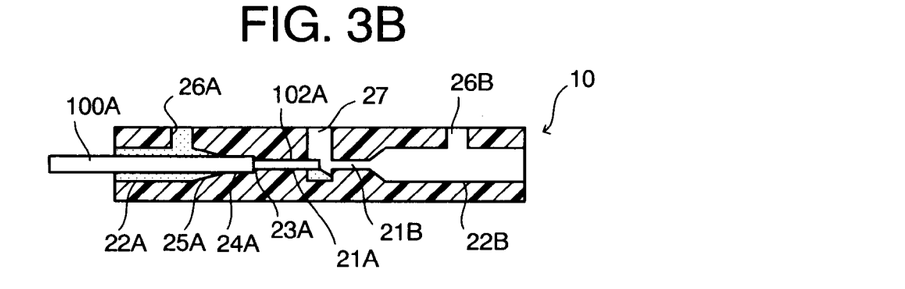

Then, one (the first coated optical fiber 100A) of a pair of coated optical fibers of which coating is previously removed at the leading end along a prescribed length as shown in FIG. 3B is inserted through the opening on the side of the first receiving portion 22A, its portion having the coating is pushed into the holding portion 24A, and the first coated optical fiber 100A is mechanically fixed (temporary fixation) to the optical connector body 10. At the same time, the exposed leading end of the first optical fiber 102A is inserted into the first fine hole portion 21A, and it is checked through the bubble release port 27 that the leading end has reached the bubble release port 27. Insertion of the exposed leading end of the first optical fiber 102A into the first fine hole portion can be performed smoothly because the inside and outside guiding portions 23A, 25A are disposed.

Figure 3C:
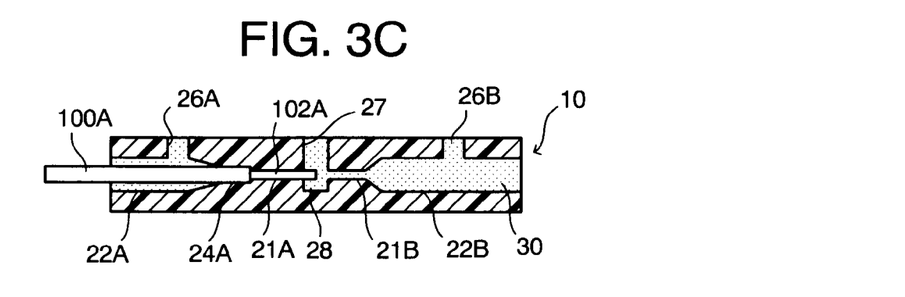
Figure 3D:
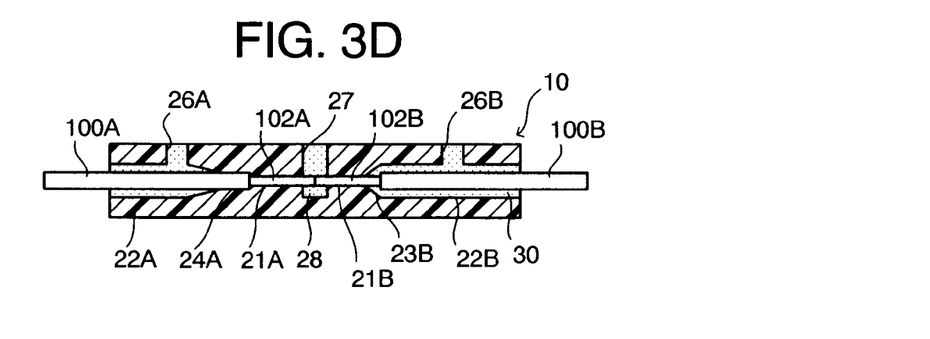

Thus, after the first coated optical fiber 100A is inserted and fixed temporarily, an additional adhesive 30 is injected through the adhesive injection port (the second adhesive injection port 26B) on the side that the identification mark 29 is not put as shown in FIG. 3C. And then the other coated optical fiber (the second coated optical fiber 100B) is inserted through the opening on the side of the second receiving portion 22B as shown in FIG. 3D, and the exposed leading end of the second optical fiber 102B is butted with the exposed leading end of the first optical fiber 102A of the first coated optical fiber 10A. Insertion of the exposed leading end of the second optical fiber 102B into the second fine hole portion 21B can be performed smoothly because the guiding portion 23B is disposed, and the inserted state can be checked through the bubble release port 27.

Then, the adhesive 30 injected while the second coated optical fiber 100B is pushed into the optical connector body 10 is cured to integrally fix the first and second coated optical fibers 100A, 100B to the optical connector body 10. Thus, the connection of the optical fibers using the above-described optical connector is completed.

A method of curing the adhesive 30 is appropriately selected depending on a type of the adhesive 30. For example, when the thermosetting type is used, it is cured by heating. When the UV curing type is used, it is cured by irradiating ultraviolet rays. In this case, it is preferable that the optical connector body 10 is formed of an ultraviolet transmissive resin, and the adhesive 30 can be cured easily by irradiating ultraviolet rays from the exterior.

The effects described below can be provided by the optical connector of this embodiment. Since one of the coated optical fibers 100A, 100B to be connected can be temporarily fixed to the optical connector, the work of mutually butting and connecting the leading ends of the optical fibers 102A, 102B can be made by merely controlling the relative positions of the optical connector body 10, to which the coated optical fiber 100A is temporarily fixed, and the other coated optical fiber 102B. Therefore, the butted state of the optical fibers 102A, 102B in the optical connector is stabilized, and they can be connected securely.

Since the butted state of the optical fibers 102A, 102B can be checked through the bubble release port 27, so that the connection reliability can be enhanced furthermore. The work can also be performed manually without using a special tool or jig, and the workability can be improved.

Even if the optical connector is fixed to a heater or the like for thermally curing the adhesive 30 with a holder, highly reliable and secure connection can be made. Thus, the workability can be improved furthermore and the connection characteristics can be stabilized furthermore, which may decrease the cost for connecting.

The butted position of the optical fibers 102A, 102B in the optical connector is substantially defined, so that a length L of the bubble release port 27 along the axial direction of the through hole 12 can be decreased to a level (e.g., about 500 μm or less) smaller than the prior art. As a result, the bubble release port 27 can be filled with only the adhesive 30 injected through the adhesive injection ports 26A, 26B by capillary action of the bubble release port 27, it becomes unnecessary to inject the adhesive 30 for reapplying it directly into the bubble release port 27, and the air bubbles in the adhesive 30 can be removed without fail. And, since the adhesive 30 flows from the first and second fine hole portions 21A, 21B toward the bubble release port 27, minute debris in the first and second fine hole portions 21A, 21B are discharged for removal. Therefore, high-quality connection can be made without involvement of air bubbles or minute debris in the adhesive 30.

Since the space 28 is formed at the bottom of the bubble release port 27 to keep the butted portion of the exposed leading ends of the optical fibers 102A, 102B in non-contact with the inner walls of the first and second fine hole portions 21A, 21B, even if the leading ends of the optical fibers 102A, 102B to be connected have a projection toward the exterior in the radial direction involved in the cut-off of the optical fibers, this projection does not come into contact with the inside walls of the first and second fine hole portions 21A, 21B. Therefore, axial displacement due to the projection can be prevented from occurring, and connection can be made without a large loss.

Figure 4A:
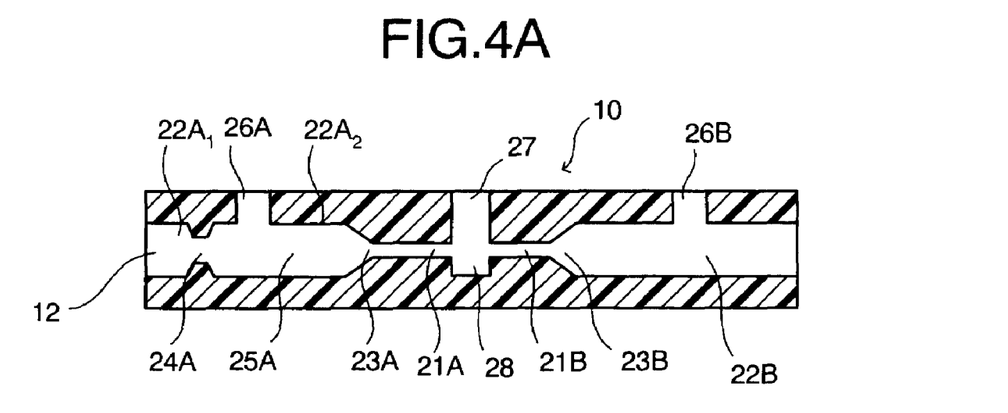
FIG. 4A is a sectional view showing a modified example of the optical connector according to an embodiment of the invention.
Figure 4B:
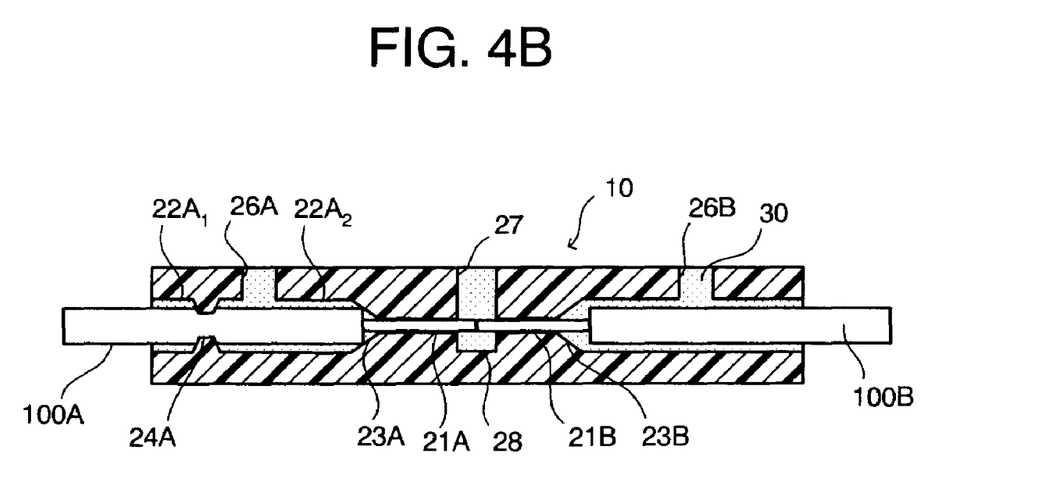
FIG. 4B is a sectional view showing a state that coated optical fibers are connected by using the optical connector shown in FIG. 4A.
Figure 5A:
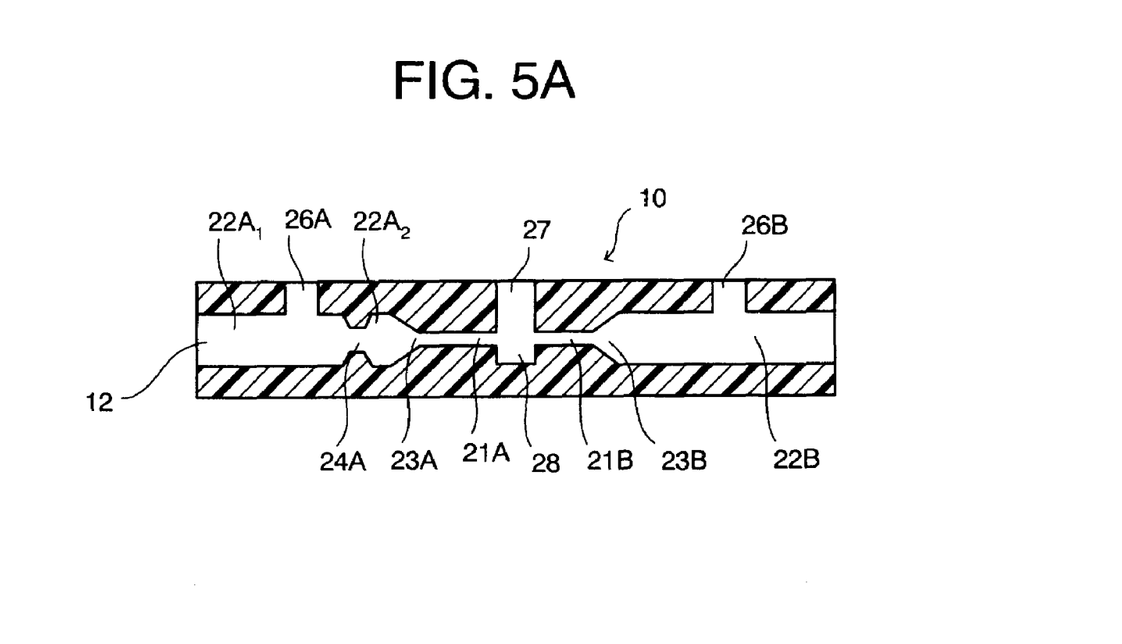
FIG. 5A is a sectional view showing another modified example of the optical connector according to an embodiment of the invention.
Figure 5B:
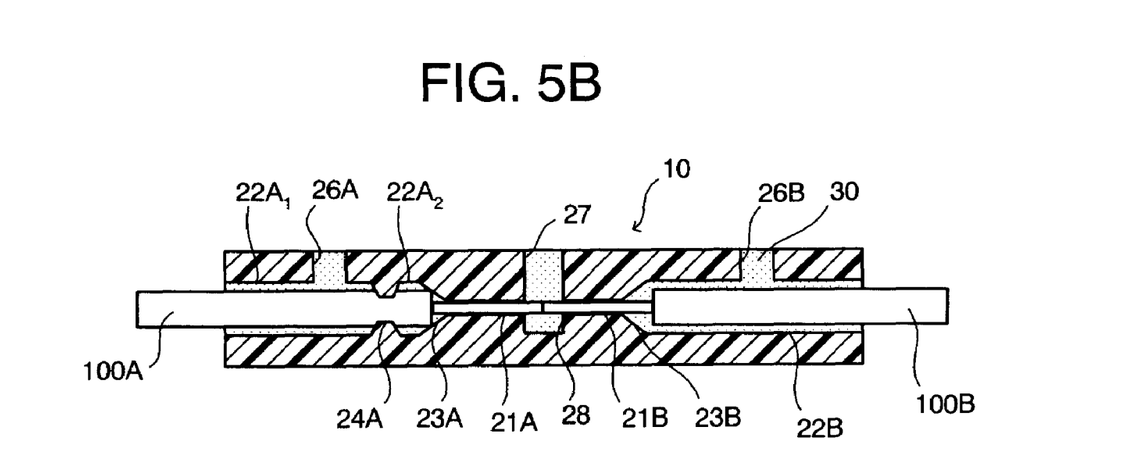
FIG. 5B is a sectional view showing a state that coated optical fibers are connected by using the optical connector shown in FIG. 5A.

In the above-described embodiment, a position, where the holding portion 24A is formed, is not limited between the first receiving portion 22A and the first fine hole portion 21A. For example, it may be disposed near the exterior from the first adhesive injection port 26A at a position in the middle of the first receiving portion 22A as shown in FIG. 4A or near the inside from the first adhesive injection port 26A in the middle of the first receiving portion 22A as shown in FIG. 5A, (here, the first receiving portion 22A is divided into two portions $22A_1$, $22A_2$). In the embodiment shown FIGS. 4A and 4B, the adhesive injection port 26A is at the portion $22A_2$ of the first receiving portion 22A between the first fine hole portion 21A and the holding portion 24A. In the embodiment shown FIGS. 5A and 5B, the adhesive injection port 26A is at the portion $22A_1$ of the first receiving portion 22A between the holding portion 24A and the opening of the through hole 12. Here, FIGS. 4B and 5B are sectional views showing states that coated optical fibers 10A, 100B are connected using the optical connectors 10 shown in FIGS. 4A and 4B, respectively. Each of the optical connectors 10 shown in FIGS. 4A and 5A is substantially the same in structure as the optical connector 10 shown in FIG. 1A except for some modifications of a position where the holding portion 24A is formed and a shape or the like of the first receiving portion 22A. Therefore, the connecting processes of optical fibers using them are substantially the same.

The invention is not limited to the embodiments described above. It is to be understood that modifications and variations of the embodiments can be made without departing from the spirit and scope of the invention.

What is claimed is:

1. An optical connector configured to connect a pair of coated optical fibers, each of which comprises an exposed leading end of optical fiber, comprising:
   a connector body including:
      a fine hole portion for housing and mutually butting the exposed leading ends of the pair of coated optical fibers,
      a first receiving portion and a second receiving portion, which are disposed at both outer sides in the axial direction of the fine hole portion, for housing the coated optical fibers without pressing the coating,
      a holding portion including a protrusion protruding from a surface of at least one of the first and second receiving portions, the protrusion being narrower than an outer diameter of a coating of at least one of the optical fibers, which is disposed at an outer side in the axial direction of the fine hole portion and at a side of the first receiving portion against the fine hole portion, configured to house one of the coated optical fibers and holding the coated optical fiber by mechanically pressing the coating at the protrusion, and
      an adhesive injection port for injecting an adhesive from the exterior into the first and second receiving portions, which is disposed at the first receiving portion between the fine hole portion and the holding portion.

2. The optical connector of claim 1, wherein the holding portion has a sectional shape in a plane perpendicular to the axial larger than the fine hole portion and smaller than the receiving portion on the same side.

3. The optical connector according to claim 1, wherein the holding portion is disposed between the fine hole portion and the first receiving portion.

4. The optical connector of claim 1, wherein the holding portion is disposed in the middle of the receiving portion.

5. The optical connector of claim 3, wherein the holding portion has a tapered portion.

6. The optical connector of claim 1, further comprising a bubble release port for releasing air bubbles contained in an adhesive that is applied into the first and second receiving portions, the bubble release port being disposed in a vicinity of a position where the exposed leading ends of the optical fibers are mutually butted in the fine hole portion.

7. The optical connector of claim 6, wherein a space is formed at the bottom of the bubble release port to keep the butted portion of the optical fibers in non-contact with the inner wall of the fine hole portion.

8. An optical connector for connecting a pair of coated optical fibers, each of which comprises an exposed leading end of optical fiber, comprising:
   a connector body including:
      a fine hole portion for housing and mutually butting the exposed leading ends of the pair of coated optical fibers,
      a first receiving portion and a second receiving portion, which are disposed at both outer sides in the axial direction of the fine hole portion, for housing the coated optical fibers without pressing the coating respectively,
      a holding portion including a protrusion protruding from a surface of at least one of the first and second receiving portions the protrusion being narrower than an outer diameter of a coating of at least one of the optical fibers, which is disposed at an outer side in the axial direction of the fine hole portion and at a side of the first receiving portion against the fine hold portion, configured to house one of the coated optical fibers and holding the coated optical fiber by mechanically pressing the coating at the protrusion, and
      an adhesive injection port for injecting an adhesive from the exterior into the first and second receiving portions, which is disposed at the first receiving portion at an outer side of the holding portion.

9. A process to connect a pair of coated optical fibers, each of which comprises an exposed leading end of optical fiber, using an optical connector, comprising:
   applying an adhesive into the optical connector, wherein the optical connector comprises a connector body including a fine hole portion for housing and mutually butting the exposed leading ends of the pair of coated optical fibers, a first receiving portion and a second receiving portion, which are disposed at both outer sides in the axial direction of the fine hole portion, for housing the coated optical fibers without pressing the coating respectively, and a holding portion including a protrusion protruding from a surface of at least one of the first and second receiving portions, the protrusion being narrower than an outer diameter of a coating of at least one of the optical fibers, which is disposed at an outer side in the axial direction of the fine hole portion and at a side of the first receiving portion against the fine hole portion, configured to house one of the coated optical fibers and holding the coated optical fiber by mechanically pressing the coating at the protrusion, and wherein the adhesive is applied into the fine hole portion;
   inserting one of the coated optical fibers through an opening formed at an end surface of the connector body, at a side of the first receiving portion against the fine hole portion, to house the exposed leading end of optical fiber in the fine hole portion and to hold the coated optical fiber in the holding portion;
   inserting the other of the coated optical fibers to butt the exposed leading end of optical fiber with the exposed leading end of optical fiber of the inserted coated optical fiber within the fine hole portion; and
   fixing the individual optical fibers to the optical connector with the adhesive,
   wherein the inserting of one of the coated optical fibers to house the exposed leading end of optical fiber in the fine hole portion and to hold the coated optical fiber in the holding portions performed after the applying of the adhesive.

10. The process of claim 9, wherein the holding portion has a sectional shape larger than the fine hole portion and smaller than the receiving portion on the same side.

11. The process of claim 9, wherein the optical connector further comprises an adhesive injection port for injecting the adhesive into the first and second receiving portions, and the adhesive is injected through the adhesive injection port.

12. The process of claim 9, wherein the optical connector further comprises a bubble release port for releasing air bubbles contained in the adhesive in a vicinity of a position where the exposed leading ends of optical fiber are mutually butted in the fine hole portion.

13. The process of claim 9, further comprising applying an adhesive into the second receiving portion after the holding of the coated optical fiber.

14. The process of claim 9, wherein the connector body comprises an identification mark attached on the surface thereof to indicate a position under which the holding portion is formed.

15. A process to connect a pair of coated optical fibers, each of which comprises an exposed leading end of optical fiber, using an optical connector, comprising:

applying an adhesive into the optical connector, wherein the optical connector comprises a connector body including a fine hole portion for housing and mutually butting the exposed leading ends of the pair of coated optical fibers, a first receiving portion and a second receiving portion, which are disposed at both outer sides in the axial direction of the fine hole portion, for housing the coated optical fibers without pressing the coating respectively, and a holding portion including a protrusion protruding from a surface of at least one of the first and second receiving portions the protrusion being narrower than an outer diameter of a coating of at least one of the optical fibers, which is disposed at an outer side in the axial direction of the fine hole portion and at a side of the first receiving portion against the fine hole portion, configured to house one of the coated optical fibers and holding the coated optical fiber by mechanically pressing the coating at the protrusion, and wherein the adhesive is applied into the fine hole portion;

inserting one of the coated optical fibers through an opening formed at an end surface of the connector body, at a side of the first receiving portion against the fine hole portion, to house the exposed leading end of optical fiber in the fine hole portion and to hold the coated optical fiber in the holding portion;

inserting the other of the coated optical fibers to butt the exposed leading end of optical fiber with the exposed leading end of optical fiber of the inserted coated optical fiber within the fine hole portion; and fixing the individual optical fibers to the optical connector with the adhesive, wherein the optical connector further comprises an adhesive injection port for injecting the adhesive into the first and second receiving portions, the adhesive injection port being disposed at the first receiving portion between the fine hole portion and the holding portion, and the adhesive is injected through the adhesive injection port.

16. A process to connect a pair of coated optical fibers, each of which comprises an exposed leading end of optical fiber, using an optical connector, comprising:

applying an adhesive into the optical connector, wherein the optical connector comprises a connector body including a fine hole portion for housing and mutually butting the exposed leading ends of the pair of coated optical fibers, a first receiving portion and a second receiving portion, which are disposed at both outer sides in the axial direction of the fine hole portion, for housing the coated optical fibers without pressing the coating respectively, and a holding portion including a protrusion protruding from a surface of at least one of the first and second receiving portions the protrusion being narrower than an outer diameter of a coating of at least one of the optical fibers, which is disposed at an outer side in the axial direction of the fine hole portion and at a side of the first receiving portion against the fine hole portion, configured to house one of the coated optical fibers and holding the coated optical fiber by mechanically pressing the coating at the protrusion, and wherein the adhesive is applied into the fine hole portion;

inserting one of the coated optical fibers through an opening formed at an end surface of the connector body, at a side of the first receiving portion against the fine hole portion, to house the exposed leading end of optical fiber in the fine hole portion and to hold the coated optical fiber in the holding portion;

inserting the other of the coated optical fibers to butt the exposed leading end of optical fiber with the exposed leading end of optical fiber of the inserted coated optical fiber within the fine hole portion; and fixing the individual optical fibers to the optical connector with the adhesive, wherein the optical connector further comprises an adhesive injection port for injecting the adhesive into the first and second receiving portions, the adhesive injection port being disposed at the first receiving portion at an outer side of the holding portion, and the adhesive is injected through the adhesive injection port.

\* \* \* \* \*